United States Patent
Yamamoto

(10) Patent No.: US 6,450,565 B2
(45) Date of Patent: Sep. 17, 2002

(54) SIDE WALL CONSTRUCTION OF VEHICLE BODY WITH DOOR REINFORCED LONGITUDINALLY

(75) Inventor: Ryouichi Yamamoto, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/838,288

(22) Filed: Apr. 20, 2001

(30) Foreign Application Priority Data

May 29, 2000 (JP) ........................................ 2000-158400

(51) Int. Cl.[7] .................................................. B60J 7/00
(52) U.S. Cl. .................. 296/188; 296/146.6; 296/146.7; 296/146.5
(58) Field of Search .................................. 296/188, 210, 296/189, 202, 195, 198, 146.5, 146.6; 280/804, 730.2; 292/340

(56) References Cited

U.S. PATENT DOCUMENTS

| | | | |
|---|---|---|---|
| 3,936,090 A | * 2/1976 | Aya et al. ................. | 296/146.6 |
| 4,582,357 A | * 4/1986 | Nakamura et al. .......... | 296/155 |
| 4,684,166 A | * 8/1987 | Kanodia .................... | 296/188 |
| 4,948,196 A | * 8/1990 | Baba et al. ................. | 296/188 |
| 5,033,236 A | * 7/1991 | Szerdahelyi et al. ........ | 296/188 |
| 5,171,058 A | * 12/1992 | Ishikawa .................. | 296/146.7 |
| 5,417,470 A | * 5/1995 | Holt ........................... | 296/188 |
| 5,429,410 A | * 7/1995 | Fleischer ................... | 296/188 |
| 5,505,024 A | * 4/1996 | DeRees et al. ............. | 296/146.5 |
| 5,599,057 A | * 2/1997 | Hirahara et al. ............. | 296/188 |
| 5,800,007 A | * 9/1998 | Cho ........................... | 296/188 |
| 5,884,960 A | * 3/1999 | Wycech .................... | 296/146.6 |
| 5,984,402 A | * 11/1999 | Takeuchi ................... | 296/188 |
| 6,015,182 A | * 1/2000 | Weissert et al. ........... | 296/146.6 |
| 6,039,384 A | * 3/2000 | Schulte et al. ............ | 296/146.5 |
| 6,073,992 A | * 6/2000 | Yamauchi et al. .......... | 296/188 |
| 6,220,652 B1 | * 4/2001 | Browne et al. ............. | 296/188 |
| 6,231,112 B1 | * 5/2001 | Fukumoto et al. ......... | 296/146.5 |
| 6,302,473 B1 | * 10/2001 | Weber ....................... | 296/188 |
| 6,332,641 B1 | * 12/2001 | Okana ....................... | 296/188 |

FOREIGN PATENT DOCUMENTS

| | | | |
|---|---|---|---|
| EP | 1068970 | * | 6/2000 |
| JP | 64 47615 | * | 2/1989 |
| JP | A 4-126678 | | 4/1992 |
| JP | A9-095197 | | 4/1997 |

* cited by examiner

Primary Examiner—Ken Patel
(74) Attorney, Agent, or Firm—Oliff & Berridge, PLC

(57) ABSTRACT

In a side wall construction of a vehicle body, including an annular frame structure composed of a front pillar portion, a rear pillar portion, a roof side portion connecting upper ends of the front and rear pillar portions with one another, and a locker portion connecting lower ends of the front and rear pillar portions with one another, and a door adapted to selectively open or close the framed door opening, the door is longitudinally reinforced by a longitudinal reinforcement so that, when the front pillar portion is biased toward the rear pillar portion by a force longitudinal to the vehicle body, a larger part of the force is transmitted through the door than through the roof side portion.

6 Claims, 3 Drawing Sheets

SIDE WALL CONSTRUCTION OF VEHICLE BODY WITH DOOR REINFORCED LONGITUDINALLY

BACKGROUND OF THE INVENTION

1. Field of the Invention

The present invention relates to the art of vehicle body construction of a vehicle such as an automobile, and more particularly, to a side wall construction of a vehicle body reinforced against a longitudinal clashing.

2. Description of the Prior Art

A vehicle such as an automobile generally has a side wail construction such as shown in FIGS. 1 and 2, wherein FIG. 2 shows a section along line II—II in FIG. 1. As shown in these figures, the conventional side wall construction generally designated by 10 includes an annular frame portion generally designated by 12 composed of a first pillar portion (front pillar) 14, a second pillar portion (center pillar) 16 displaced rearward from the first pillar portion, a roof side portion 18 connecting an upper end of the second pillar portion with an upper end of the first pillar portion, and a locker portion 20 connecting a lower end of the second pillar portion with a lower end of the first pillar portion, so as to define a framed door opening 22, and a door (front door) 24 adapted to selectively open or close the framed door opening 22.

The door 24 has an upper half portion 24U providing a window opening 26, and a lower half portion 24L having an upper edge 24E defining a lower edge of the window opening 26. Generally, the lower half portion 24L of the door is assembled from an outer door panel 28 and an inner door panel 30. Rim members 32 and 34 are mounted along upper edges of the outer and inner door panels 28 and 30, respectively, to form the lower edge 24E of the window opening 26, with rubber seal members 36 and 38 fastened to the rim members 32 and 34, respectively, to define a slit opening through which a window glass 40 diagrammatically shown in FIG. 2 is guided. The inside surface of the lower half portion of the door is covered with a cushion layer 42.

A strip plate member formed into a channel shape such as shown by 44 is generally conventionally attached to the inside of the outer door panel 28 along the upper edge thereof by spot welding or the like, so as to increase the firmness of the door configuration.

A front side member 46 for suspending a front wheel 48 is firmly connected to a lower portion of the first pillar portion 14 at its rear end, while a front fender apron 50 is mounted on the front side member 46. A construction for a firm connection of the front side member 46 to the first pillar portion 14 is shown in Japanese Patent Laid-open Publication 4-126678 assigned to the same assignee as the present application.

When the vehicle having a side wall construction such as shown in FIGS. 1 and 2 collides with an obstacle at its front end, a collision force such as shown by an arrow Fa is transmitted through the front side member 46 to the first pillar portion 14, and further, after a small deformation of the side wall construction, the collision force Fa is partly diverted to a force such as shown by an arrow Fb transmitted to the first pillar member 14 via the front fender apron 50 as shown in FIG. 1.

In the conventional side wall construction, a larger part of the collision force Fa is transmitted to the locker portion 20 as shown by an arrow Fc and to the roof side portion 18 as shown by an arrow Fd than to the door 24 as shown by an arrow Fe. In other words, the door 24 of the conventional construction does not much support the collision force Fa because of its low strength against the longitudinal compression. This is due to a generally rounded configuration of the door provided by an assembly of the outer door panel and the inner door panel, each being a relatively thin metal plate moderately curved when viewed in a horizontal section along the side planar contour of the vehicle body, thereby presenting a longitudinally flexible construction against a longitudinal compression. The channel shaped strip plate member 44 in the conventional construction, alone or in combination with a corresponding part of the outer door panel 28 with which it forms a tubular construction, does not much effectively support a compression force applied to the door because of its poor firmness by itself due to a thin wall construction partly provided by the outer door panel 28.

SUMMARY OF THE INVENTION

In reviewing such a conventional side wall construction of the vehicle body, it is contemplated that if the longitudinal strength of the door against a longitudinal collision force is increased so as to bear a larger force Fe, the force Fd transmitted through the roof side portion 16 is decreased, so that the head portion of the driver or the passenger is more effectively protected from being damaged by a collision causing a rearward clashing of the roof portion of the vehicle body.

In view of the above, it is a primary object of the present invention to provide an improved side wall construction of a vehicle body in which a longitudinal collision force is more effectively supported by a door.

According to the present invention, such a primary object is accomplished by a side wall construction of a vehicle body, comprising an annular frame structure composed of a first pillar portion, a second pillar portion displaced rearward from the first pillar portion, a roof side portion connecting an upper end of the second pillar portion with an upper end of the first pillar portion, and a locker portion connecting a lower end of the second pillar portion with a lower end of the first pillar portion, so as to define a framed door opening, and a door adapted to selectively open or close the framed door opening, wherein the door is longitudinally reinforced by a longitudinal reinforcement so that, when the first pillar portion is biased toward the second pillar portion by a force longitudinal to the vehicle body, a larger part of the force is transmitted through the door than through the roof side portion.

When the door is so longitudinally reinforced by a longitudinal reinforcement that, when the first pillar portion is biased toward the second pillar portion by a force longitudinal to the vehicle body, a larger part of the force is transmitted through the door than through the roof side portion, the door operates more effectively to support the longitudinal force applied to the side wall construction by a longitudinal collision, thereby decreasing the rearward clash shifting of the roof portion of the vehicle body, so that the danger of the driver and the passenger sitting aside to the driver being damaged at their heads is effectively decreased.

In this connection, it will be appreciated that the condition of a larger part of the force being transmitted through the door than through the roof side portion according to a biasing of the first pillar portion toward the second pillar portion is satisfied when the longitudinal compression strength of at least the longitudinal reinforcement is larger than that of the roof side portion.

When the side wall construction is so constructed that the door is assembled substantially from an outer door panel and an inner door panel, the longitudinal reinforcement may incorporates a tubular type member extending substantially longitudinally of the vehicle body, the tubular type member having an annular cross section separate from the outer and inner door panels.

Since a tubular type member is highly resistive against a compression under a twisting, when such a tubular type longitudinal reinforcement is incorporated into the door separately from the outer and inner door panels, so as to extend substantially longitudinally of the vehicle body, a longitudinally compressive force applied to the door, which is liable to twist when longitudinally compressed thereby more readily subjecting to a compression clashing, is effectively supported so as to let the door be a more effective structural component of the side wall construction of the vehicle to bear such a longitudinal force applied thereto due to a longitudinal collision of the vehicle.

When the door has an upper half portion providing a window opening, and a lower half portion having an upper edge thereof defining a lower edge of the window opening, the longitudinal reinforcement may be provided in the lower half portion so as to extend along the upper edge thereof. In this case, the longitudinal reinforcement may substitute for a corresponding upper edge portion of the inner door panel so as to form the upper edge of the lower half portion of the door.

The longitudinal reinforcement may have a quadrilateral cross section so as more desirably to conform to the cross sectional condition of the door, although the invention is not limited to such a construction in view of the essential function of the longitudinal reinforcement.

According to the present invention, the door may further comprise a lateral cushion combined with the longitudinal reinforcement such that a driver or a passenger sitting aside to the longitudinal reinforcement is laterally softly supported by the longitudinal reinforcement. Such a lateral cushion may be an inverted gutter member presenting a convex side thereof toward the inside of the vehicle body, so as to present a flexible support surface toward the driver or the passenger. Such a lateral cushion may be provided to extend along only a longitudinal part of the longitudinal reinforcement so as to correspond to the upper half portion of the driver or the passenger sitting thereaside.

The side wall construction according to the present invention may be so constructed as to comprise a front side member and a front fender apron, with the first pillar portion to be a front pillar portion to which the front side member is connected and the front fender apron is contactible when biased rearward due to a longitudinal corruption of the front side member, while the second pillar portion is a center pillar portion.

BRIEF DESCRIPTION OF THE DRAWINGS

In the accompanying drawings.

DESCRIPTION OF THE EMBODIMENT

In the following, the present invention will be described in more detail in the form a preferred embodiment with reference to FIGS. 3–6.

Figure 1:
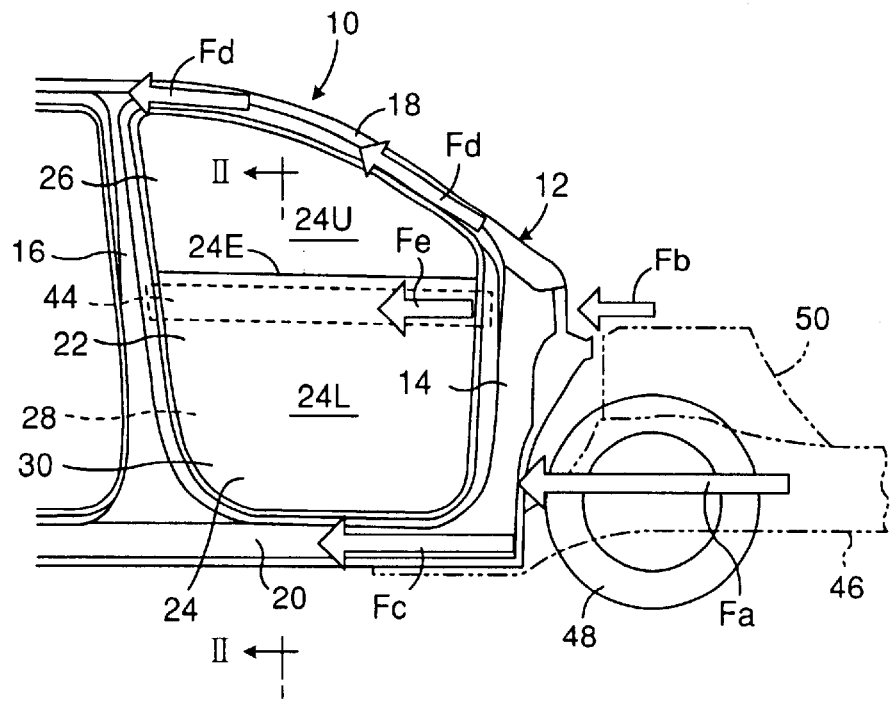
FIG. 1 is a partial inside view of a conventional side wall construction of a vehicle body of a vehicle such as an automobile.
Figure 2:
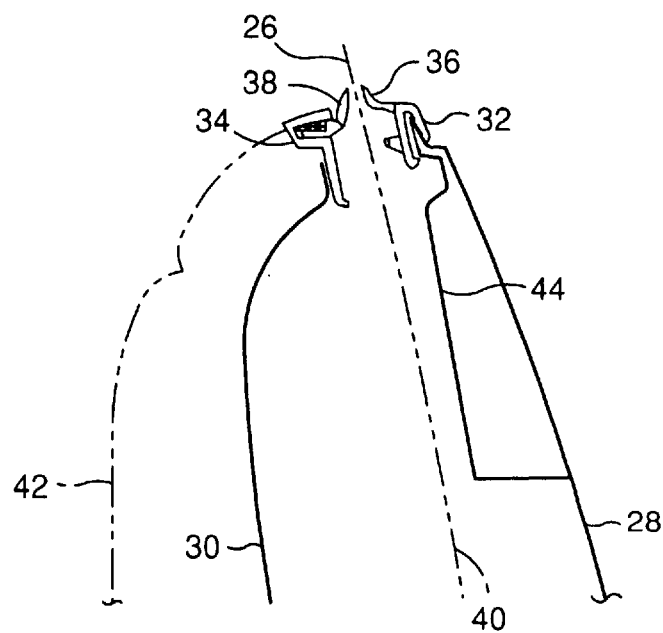
FIG. 2 is a cross sectional view of the lower half portion of the door shown in FIG. 1 along a section II—II indicated therein.
Figure 3:
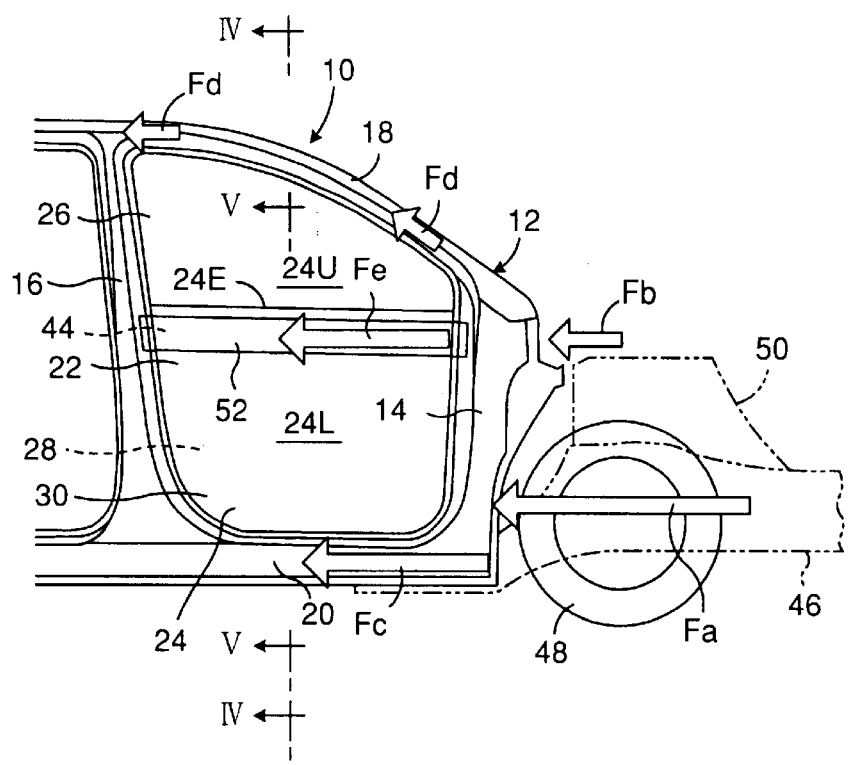
FIG. 3 is a view similar to FIG. 1, showing an embodiment of the side wall construction according to the present invention.
Figure 4:
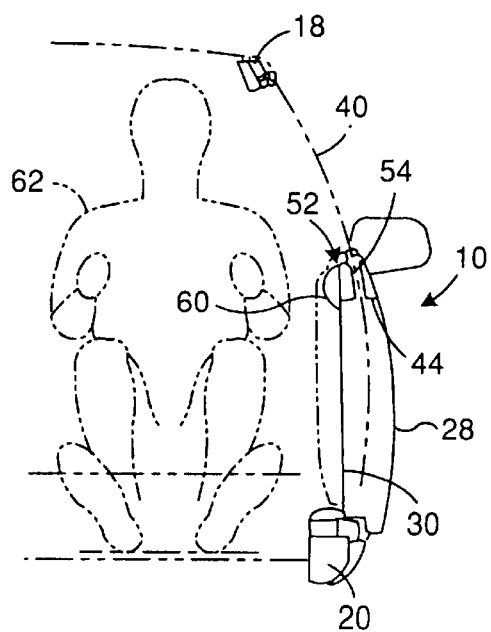
FIG. 4 is a cross sectional view of the side wall construction shown in FIG. 3 along a section IV—IV indicated therein.
Figure 5:
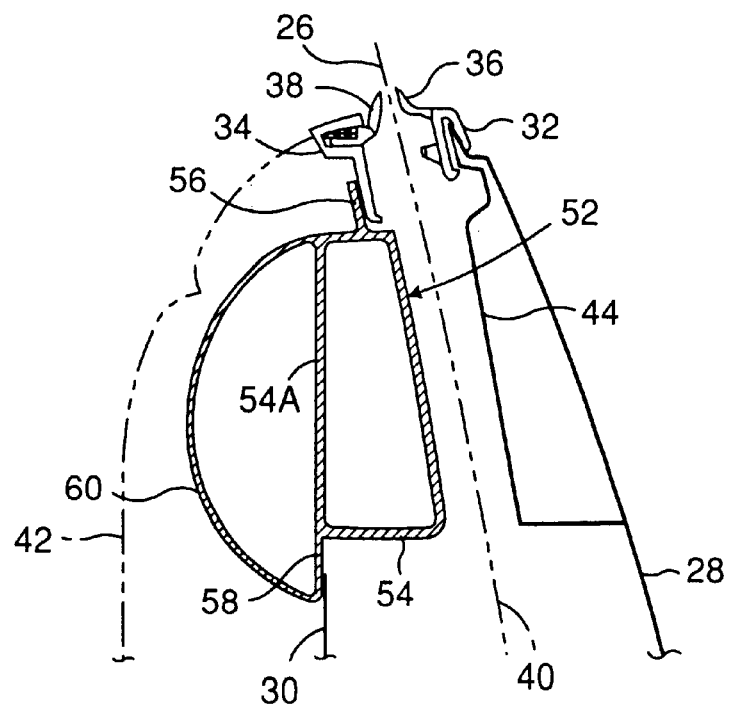
FIG. 5 is a cross sectional view similar to FIG. 2, showing the lower half portion of the door shown in FIGS. 3 and 4 along a section V—V indicated in FIG. 3.

In FIGS. 3–6, particularly in FIGS. 3 and 5 showing the embodiment of the present invention according to views similar to FIGS. 1 and 2 showing the conventional construction, the portions common with the conventional construction are designated by the same reference numerals as in FIGS. 1 and 2. Since these common portions operate in the same manner as in the conventional construction, no repetitive detailed explanation of those common portions will be made to avoid any redundancy of the description.

In the shown embodiment, an inside portion of the upper edge portion of the lower half portion 24L of the door is constructed by a longitudinal reinforcement 52 substantially formed as a tubular member 54 having a quadrilateral cross section as an embodiment for a better adaptation to the cross sectional shape of the door, with an upper flange portion 56 provided along its upper edge for a convenience of mounting the rim member 34 thereon in the same manner as in the conventional construction, and a lower flange portion 58 provided along a half of its lower edge for a convenience of constructing a lateral cushion 60 as described hereinbelow.

Figure 6:
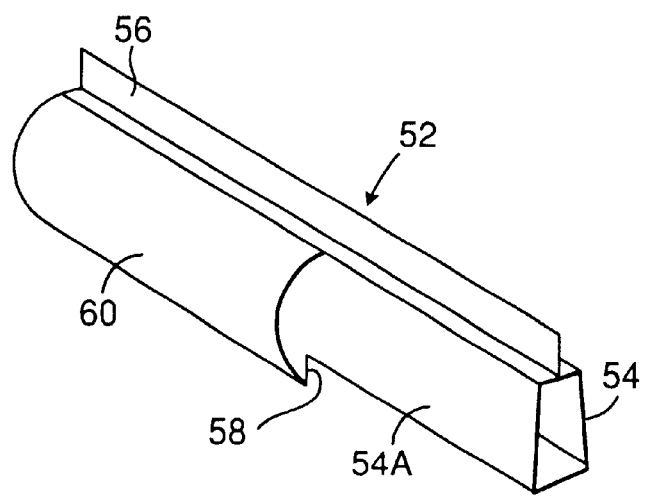
FIG. 6 is a perspective view of the longitudinal reinforcement disassembled from the door construction.

Therefore, the longitudinal reinforcement 52 substitutes for an upper edge part of the inner door panel 30 in the conventional construction, so that the inner door panel 30 is shortened so as to be joined with a lower edge portion of the longitudinal reinforcement 52, partly at the lower flange portion 58 (as shown in FIG. 5) and partly directly at a lower edge portion of the side wall 54A thereof, since the lower flange portion 58 is provided to extend only a half of the length thereof, as shown in FIG. 6. Further, since the upper edge of the lower door portion is generally positioned at a vertically central portion of the door, the longitudinal reinforcement 52 reinforces the door along its vertical center, so that the strength of the door against a longitudinal collision force is increased with a good balance around a vertical center thereof.

It is desirable that the longitudinal reinforcement tubular member 54 for the longitudinal reinforcement 52 is made as an integral member with or without the flange portions 56 and 58 by the art of extrusion forming of an aluminum alloy or the like, because such an integral tubular member shows a higher strength against a longitudinal compression under a twisting than an assembled member, although the invention is not limited to such an integral construction.

The lateral cushion 60 is made of an inverted gutter member presenting its convex side toward the inside of the vehicle body, so as to provide a lateral cushion for an upper body portion of a driver (or a passenger on the other side). In view of this purpose, the lateral cushion 60 is provided only along a rear half length of the longitudinal reinforcement 52, though it may be provided along the full length of the tubular member 54. The lateral cushion 60 may be made integrally with the tubular member 54, or may be made separately by an aluminum alloy or the like and assembled with the tubular member 54. It will be appreciated that the lateral cushion 60 also has an effect of increasing the longitudinal reinforcement 52 along a corresponding partial length thereof.

By the upper edge portion of the lower half portion 24L of the door incorporating the longitudinal reinforcement 52 substantially formed of a tubular member such as the member 54 separate from the outer and inner door panels 28 and 30, the longitudinal compression strength of the door is substantially increased as compared with the conventional door, so that when the collision force Fa is transmitted from the front side member 46 to the first pillar portion 14, the force Fe transmitted through the door is substantially increased, so as to decrease the force Fd transmitted through the roof side member 18 to be less than the force Fe. Therefore, by the side wall construction according to the present invention, the rearward clash shifting of the front roof portion by a front collision of the vehicle is substantially decreased, so that the danger of the driver and the passenger sitting in the front seat being damaged at their heads by a front collision is effectively decreased.

The side wall construction shown and described above with reference to the driver's and passenger's front seats is analogously applicable to the passengers' rear seats with the first and the second pillar portions being converted to the center pillar and the rear pillar, respectively, so that the same functions and effects are obtained. Therefore, it will be appreciated by those skilled in the art that the present invention is not limited to the front half portion of a vehicle such as an ordinary sedan but is also applicable to a rear half portion thereof, and also to a sport type car having only the driver's seat or the driver's and an aside passenger's seat.

Although the present invention has been described in detail with respect to a preferred embodiment thereof, it will be apparent for those skilled in the art that various modifications are possible with respect to the shown embodiment within the scope of the present invention.

What is claimed is:

1. A side wall construction of a vehicle body, comprising an annular frame structure composed of a first pillar portion, a second pillar portion displaced rearward from the first pillar portion, a roof side portion connecting an upper end of the second pillar portion with an upper end of the first pillar portion, and a locker portion connecting a lower end of the second pillar portion with a lower end of the first pillar portion, so as to define a framed door opening, and a door adapted to selectively open or closed the framed door opening, wherein the door is longitudinally reinforced by a longitudinal reinforcement of a tubular member having an integral cross section, the tubular member providing an upper edge of a lower half portion of the door thereby defining a window opening thereabove in an upper half portion of the door, while reinforcing the door longitudinally so that, when the first pillar portion is biased toward the second pillar portion by a force longitudinal to the vehicle body with the door closed, a larger part of the force is resisted by the door than by the roof side portion.

2. A side wall construction according to claim 1, wherein the longitudinal reinforcement has a quadrilateral cross section.

3. A side wall construction according to claim 1, wherein the door further comprises a lateral cushion combined with the longitudinal reinforcement such that a driver or a passenger sitting aside to the longitudinal reinforcement is laterally softly supported by the longitudinal reinforcement.

4. A side wall construction according to claim 3, wherein the lateral cushion is an inverted gutter member presenting a convex side thereof toward the inside of the vehicle body.

5. A side wall construction according to claim 3, wherein the lateral cushion is provided to extend along only a longitudinal part of the longitudinal reinforcement so as to correspond to an upper body portion of the driver or the passenger sitting thereaside.

6. A side wall construction according to claim 1, further comprising a front side member and a front fender apron, wherein the first pillar portion is a front pillar portion to which the front side member is connected and the front fender apron is contactible when biased rearward due to a longitudinal corruption of the front side member, while the second pillar portion is a center pillar portion.

* * * * *